US008110064B2

(12) United States Patent
Arrington et al.

(10) Patent No.: US 8,110,064 B2
(45) **Date of Patent: *Feb. 7, 2012**

(54) LABELING APPARATUS WITH HOUSING HAVING FLUID PUMP AND RELATED METHODS

(75) Inventors: Clint Arrington, Lakeland, FL (US); Robert Goetz, Garden Grove, CA (US); Kent Tabor, Pewaukee, WI (US)

(73) Assignee: John Bean Technologies Corporation, Chicago, IL (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/190,421

(22) Filed: Aug. 12, 2008

(65) Prior Publication Data

US 2010/0038026 A1 Feb. 18, 2010

(51) Int. Cl.
*B32B 38/14* (2006.01)

(52) U.S. Cl. ......... 156/277; 156/249; 156/538; 156/567

(58) Field of Classification Search .................. 156/249, 156/538, 277, 567
See application file for complete search history.

(56) References Cited

U.S. PATENT DOCUMENTS

| | | | | |
|---|---|---|---|---|
| 2,528,944 | A | 11/1950 | Carter | 216/54 |
| 2,985,396 | A | 5/1961 | Johnson | 242/334.6 |
| 3,871,597 | A | 3/1975 | La Mers | 242/75.3 |
| 4,217,164 | A | 8/1980 | La Mers | 156/541 |
| 4,294,644 | A | 10/1981 | Anderson | 156/361 |
| 4,303,461 | A | 12/1981 | La Mers | 156/361 |
| 4,454,180 | A | 6/1984 | La Mers | 428/42 |
| 4,648,930 | A | 3/1987 | La Mers | 156/247 |
| 4,683,707 | A | 8/1987 | Koyama | 53/502 |
| 4,928,229 | A | 5/1990 | Teraoka et al. | 364/464 |
| 5,779,453 | A * | 7/1998 | Nagayama et al. | 417/410.4 |
| 5,829,351 | A | 11/1998 | Anderson et al. | 101/36 |
| 6,047,755 | A | 4/2000 | Anderson et al. | 156/351 |
| 6,230,779 | B1 | 5/2001 | Anderson et al. | 156/567 |
| 6,408,916 | B1 | 6/2002 | Anderson et al. | 156/351 |
| 6,427,746 | B1 | 8/2002 | Anderson et al. | 156/541 |
| 6,712,109 | B2 | 3/2004 | Anderson et al. | 156/351 |

(Continued)

FOREIGN PATENT DOCUMENTS

EP 0113256 7/1984

(Continued)

OTHER PUBLICATIONS

AG-Tronic Control Systems Inc, Innovative Solutions for Total Automation, "ORBIT Label Apllicator", pp. 1-2, copyright 2000-2002, www.ag-tronic.com/orbit/orbit.html.

*Primary Examiner* — Yogendra Gupta
*Assistant Examiner* — John Robitaille
(74) *Attorney, Agent, or Firm* — Allen, Dyer, Doppelt, Milbrath & Gilchrist, P.A.

(57) ABSTRACT

A labeling apparatus is for applying labels to articles advanced along an article conveyor. The labeling apparatus may include a frame to be positioned adjacent the article conveyor, and a labeler carried by the frame. The labeler may include a housing, a rotary bellows wheel carried by the housing, bellows carried by the rotary bellows wheel and a fluid pump within the housing and connected in fluid communication with the rotary bellows wheel to provide a fluid flow for the bellows so that each bellows is movable between a retracted position and an extended label-applying position.

23 Claims, 9 Drawing Sheets

U.S. PATENT DOCUMENTS

| | | | | |
|---|---|---|---|---|
| 6,729,375 | B2 | 5/2004 | Nielsen et al. ................ | 156/362 |
| 6,792,992 | B2 | 9/2004 | Goetz ........................... | 156/567 |
| 7,178,574 | B2 | 2/2007 | Nielsen et al. ................ | 156/542 |
| 2003/0056902 | A1 | 3/2003 | Constantine et al. ......... | 156/350 |
| 2003/0227528 | A1 | 12/2003 | Hohberger et al. ........... | 347/104 |
| 2005/0039858 | A1 | 2/2005 | Arrington ..................... | 156/540 |
| 2010/0038038 | A1 | 2/2010 | Arrington et al. ............ | 156/567 |

FOREIGN PATENT DOCUMENTS

| | | |
|---|---|---|
| EP | 1396434 | 3/2004 |
| WO | WO 99/46170 | 9/1999 |
| WO | 2005/042350 | 5/2005 |
| WO | WO 00/58157 | 10/2010 |

* cited by examiner

LABELING APPARATUS WITH HOUSING HAVING FLUID PUMP AND RELATED METHODS

FIELD OF THE INVENTION

The present invention relates to the field of labeling devices, and, more particularly, to a labeling apparatus having a rotary bellows wheel and related methods.

BACKGROUND OF THE INVENTION

A packinghouse is a facility where goods, such as fruit and vegetables, are received and processed prior to distribution to market. In the typical packinghouse, the goods are first received and then sorted based upon several factors, for example, size and quality grade. Once sorted, the goods are moved through the packinghouse via conveyor belts to labeler machines, which place labels on the goods.

During the label application phase of processing, the speed at which the labels are applied, the accuracy of the label application, and the space required by the labeler, i.e. the labeler footprint, may be important. Speed may be important because the fruit is to be packed and shipped quickly so chat the shelf life in stores will be as long as possible. Accuracy, i.e. the successful application of the proper label to the corresponding fruit, may be important for allowing the packinghouse to process produce with a label applied thereto and because packinghouse profitability is adversely affected when a label that would have permitted a higher selling price is not applied to fruit otherwise capable of commanding such higher price.

Space may be important because of the physical configuration of a given packinghouse. The fruit can be transported in a series of lanes, each lane conveying the fruit, on a plurality of cradles connected to a conveyor belt, each cradle supporting and locating an individual fruit. The fruit in each lane is sized by conventional methods and subsequently conveyed past a plurality of labelers arranged in series or banks, each of the labelers in the series of labelers being loaded with a different label, i.e. a label imprinted with indicia to identify the size and variety of the fruit. The physical arrangement of the packinghouse often limits, without major reconstruction of the building, the number of banks of labelers it is possible to install.

U.S. Pat. No. 6,427,746 to Anderson et al., assigned to the present application's assignee, discloses a labeler for labeling fruit and vegetables. The labeler may include a wheel with a plurality of extendable bellows affixed thereto for placing the labels, i.e. a bellows wheel. With this type of labeler, the bellows wheel rotates individual bellows past a magazine or cassette, which dispenses the labels from a carrier strip. The labels are held in position on the end of the bellows by application of a vacuum to the bellows that is pulled through openings in the end of the bellows. The vacuum also serves to maintain the bellows in a retracted position. As the bellows wheel is rotated, thereby moving a bellows with label dispensed thereon to an application position adjacent a fruit, positive pressure is applied and the bellows is extended to contact the fruit and apply the label thereto. Although the bellows wheel type labeler has desirable advantages and features, such a labeler may have certain drawbacks.

More particularly, in labelers of this type, the bellows wheel typically comprises an inner housing, and a rotatable outer housing, the bellows being affixed to the rotatable outer housing. The interface between the inner and rotatable outer housings may include a precisely machined bearing surface that has tighter, more demanding tolerances and is expensive to manufacture. Moreover, the housings are typically annealed for durability, which adds to the cost of manufacture. Another potential drawback to this bellows wheel labeler is a substantial maintenance schedule, since the bearing surface is subject to constant wear.

Moreover, since the tolerances between the inner housing and the rotatable outer housing are tighter, the material of these parts are matched in thermal expansion coefficients to maintain efficient operation when the labeler's temperature increases. Accordingly, the bellows wheel may have to be manufactured in materials having low coefficients of thermal expansion and/or, the labeler may have cooling features to maintain a normal operating temperature.

The typical bellows wheel labeler includes a remote external air supply for creating the vacuum and positive pressure for respectively retracting and extending the individual bellows. The remote air supply may be coupled to a plurality of labelers via tubing. The external air supply may not be desirable in applications for a low number of labelers or where the labelers are in remote locations in the packinghouse, since this may increase packinghouse layout complexity.

Furthermore, the use of the external air supply may increase the lead-time for new labeler installations. Also, the external supply, for example, a blower, may heat the air supplied to the labelers, which may overtime stress the components of the bellows wheel and reduce reliability. Additionally, the bellows wheel labeler may use a complex design to manage and schedule the application of positive pressure and vacuum to the individual bellows.

SUMMARY OF THE INVENTION

In view of the foregoing background, it is therefore, an object, of the present invention to provide a labeling apparatus that has a smaller footprint.

This and other objects, features, and advantages in accordance with the present invention are provided by a labeling apparatus for applying labels to articles advanced along an article conveyor. The labeling apparatus may comprise a frame to be positioned adjacent the article conveyor, and at least one labeler carried by the frame. The labeler may comprise a housing, a rotary bellows wheel carried by the housing, a plurality of bellows carried by the rotary bellows wheel, and a fluid pump within the housing and connected in fluid communication with the rotary bellows wheel to provide a fluid flow for the bellows so that each bellows is movable between a retracted position and an extended label-applying position. Advantageously, the labeler has a smaller footprint since the fluid pump is internal.

More specifically, the fluid pump may comprise an electrical motor and an impeller coupled thereto. Also, the labeler may further comprise a controller for controlling the electrical motor. The electrical motor may comprise a brushless DC motor, for example.

The housing may include interior portions defining at least one pressure delivery chamber extending between the fluid pump and the rotary bellows wheel. The pressure delivery chamber may comprise a positive pressure delivery chamber and a negative fluid-pressure delivery chamber.

In some embodiments, the labeler may further comprise a bellows wheel drive motor carried by the housing, and a drive coupling between the bellows wheel drive motor and the rotary bellows wheel, and extending through the at least one pressure delivery chamber. Also, the labeler may further comprise a label feeder carried by the housing adjacent the rotary bellows wheel. Further, the labeler may comprise a plurality thereof arranged in side-by-side relation.

Another aspect is directed to a method for applying labels to articles advanced along an article conveyor using at least one labeler adjacent the article conveyor and comprising a housing, a rotary bellows wheel carried by the housing and supporting a plurality of bellows. The method may include operating a fluid pump within the housing and connected, in fluid communication with the rotary bellows wheel to provide a fluid flow for the bellows so that each bellows is movable between a retracted position and an extended label-applying position.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
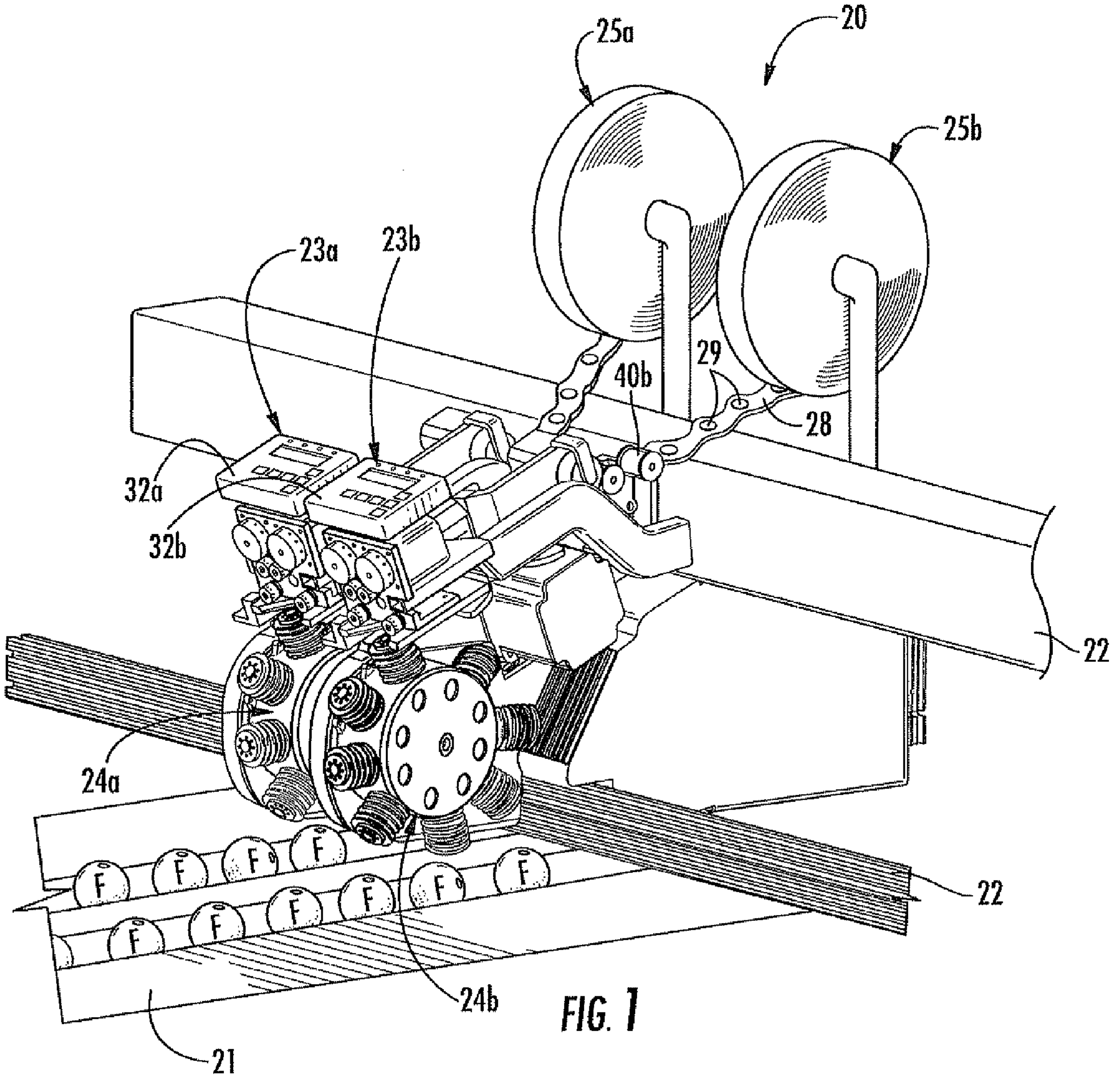
FIG. 1 is a perspective view of the labeling apparatus according to the present invention.

Referring initially to FIG. 1, a labeling apparatus 20 for applying labels 29 to articles F, for example, the illustrated fruit, advanced along an article conveyor 21 is now described. The labeling apparatus 20 illustratively includes a frame 22 positioned adjacent the article conveyor 21. The labeling apparatus 20 also illustratively includes a plurality of labelers 23*a*-23*b* carried by the frame 22, and arranged in side-by-side relation.

As will be appreciated by those skilled in the art, the article conveyor 21 positions the fruit F for application of the labels 29, and may comprise, for example, a plurality of different sized lanes for aiding in categorization of the fruit F. The fruit F are transported in a series of lanes, each lane conveying the fruit on a plurality of cradles connected to a conveyor belt, each cradle supporting and locating an individual fruit.

Each labeler 23*a*-23*b* illustratively includes a label supply 25*a*-25*b* comprising a label strip 28 being separable along a longitudinal centerline, and a plurality of labels 29 carried by the label strip. The label strip 28 has a shaped edge, for example, the illustrated sinusoidally shaped edge.

Figure 2:
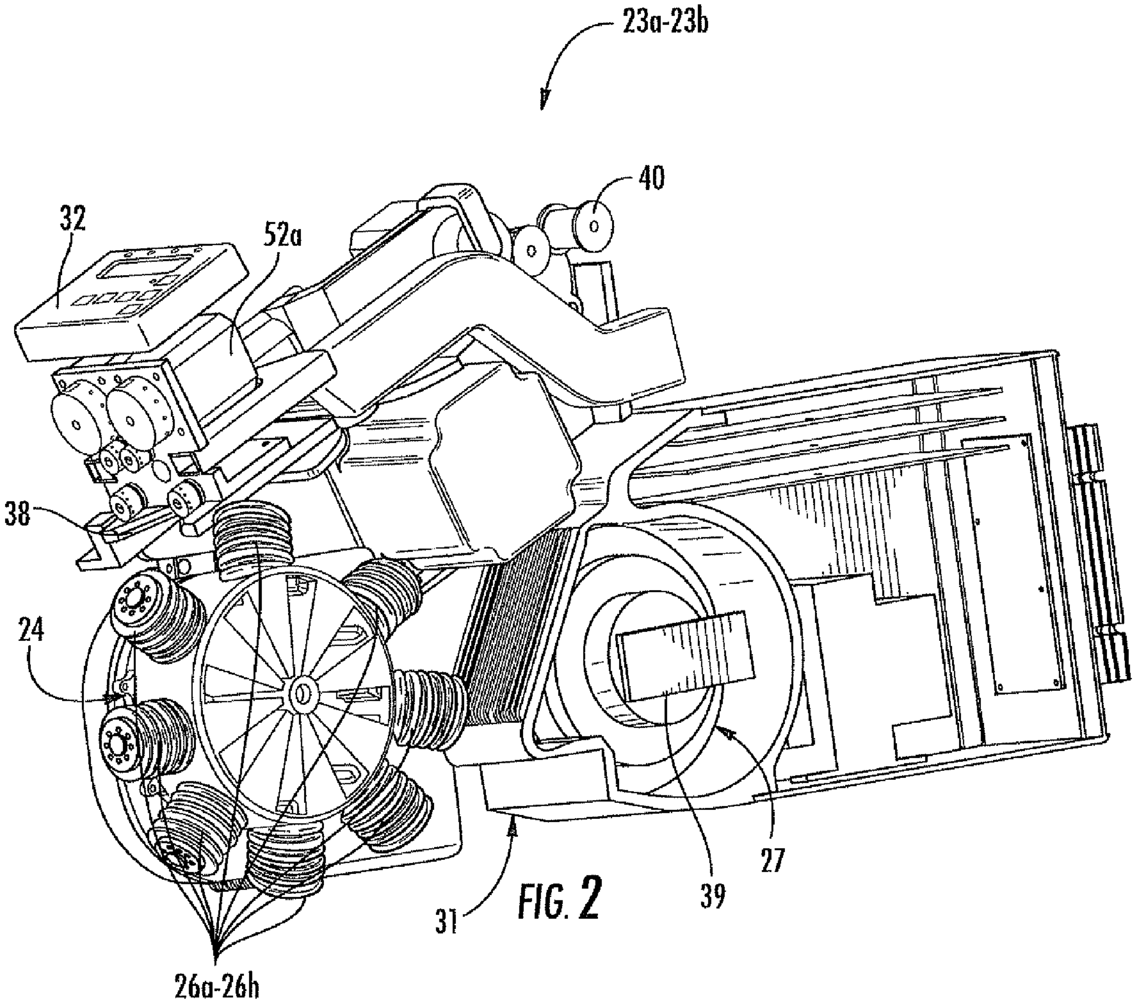
FIG. 2 is a perspective view of a labeler from FIG. 1 with covering panels removed.
Figure 3:
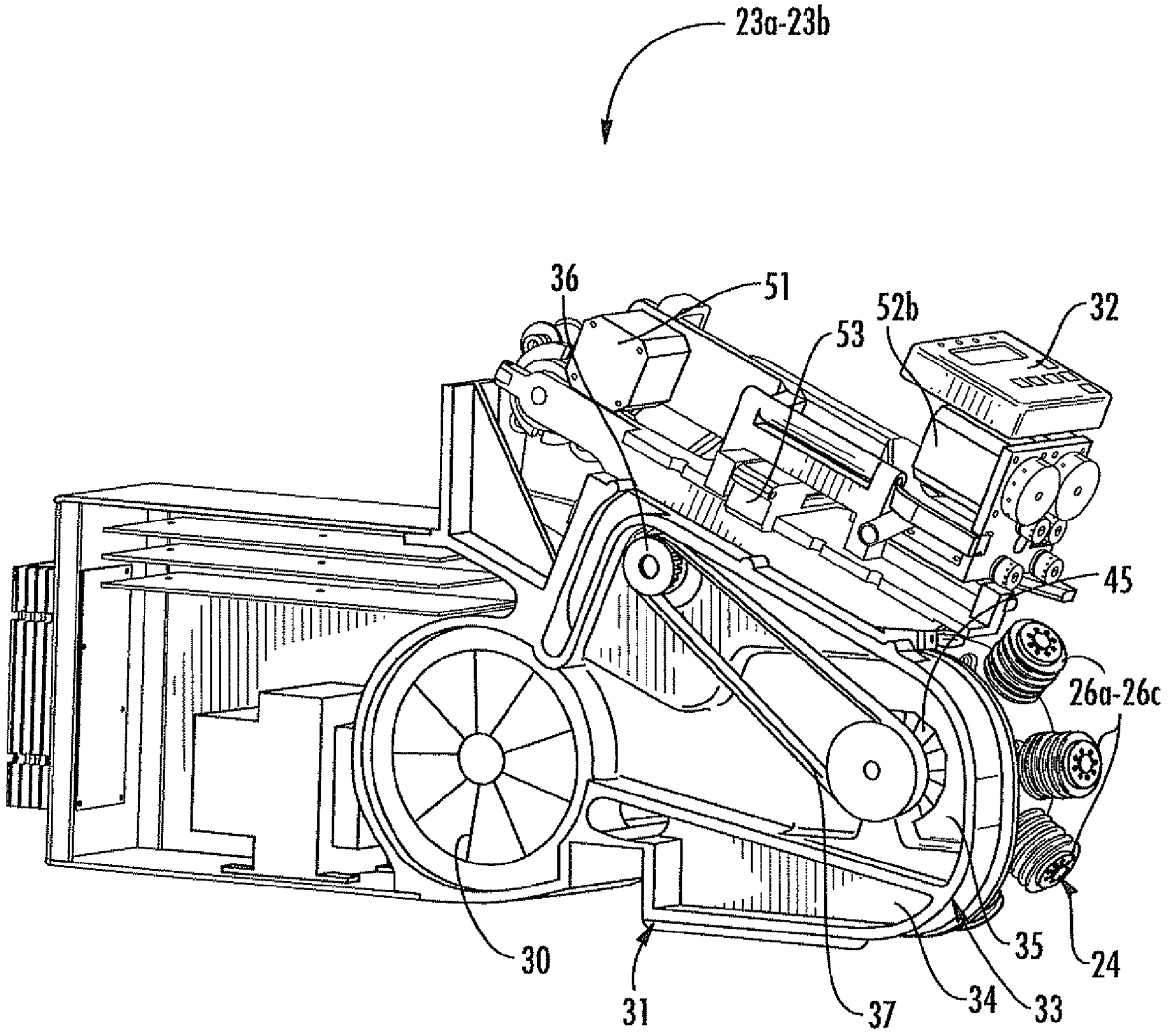
FIG. 3 is another perspective view of the labeler from FIG. 1 with covering panels removed.

Referring now additionally to FIGS. 2-3, the labeler 23*a*-23*b* illustratively includes a housing 31, a rotary bellows wheel 24 carried by the housing, a plurality of bellows 26*a*-26*h* carried by the rotary bellows wheel, and a fluid pump 27 within the housing and connected in fluid communication with the rotary bellows wheel. As will be appreciated by those skilled in the art, the distal ends of each of the bellows 26*a*-26*h* have openings for applying a negative fluid pressure therethrough to retain labels 29 on the bellows. Additionally, the label, supplies 25*a*-25*b* are illustratively carried by the housing 31. In other embodiments, not shown, the label supplies 25*a*-25*b* are supported by the frame 22.

As perhaps best seen in FIG. 2, the fluid pump 27 is internal and contained within the housing 31 of the labeler 23*a*-23*b*, thereby providing a smaller footprint for the labeler since no external blower is used as in typical labelers. The fluid pump 27 provides a fluid flow for the bellows 26*a*-26*h* so that each bellows is movable between a retracted label pick-up position and an extended label-applying position, as described in greater detail below.

More specifically, the fluid pump 27 may comprise an electrical motor 39, for example, a brushless DC motor, and an impeller 30 (FIG. 3) coupled thereto. The labeler 23*a*-23*b* illustratively includes a bellows wheel drive motor 36 (FIG. 3) carried by the housing 31, and a drive coupling, for example, the illustrated drive belt 37, between the bellows wheel drive motor and the rotary bellows wheel 24. Other types of drive couplings may also be used. Additionally, the labeler 23*a*-23*b* illustratively includes a label feeder 40 carried by the housing 31 adjacent the rotary bellows wheel 24.

The labeler 23*a*-23*b* illustratively includes a separation notch member 38 carried by the housing 31 for separating the label strip 28 into separated strip portions as it is advanced thereover. The bellows 26*a*-26*h* pick up the labels 29 from the separation notch member 38 and to place the labels on the fruit F advanced along the article conveyor 21.

The labeler 23*a*-23*b* illustratively includes a pay-out motor, for example, the illustrated pay-out stepper motor 51, (FIG. 3) adjacent the label supplies 25*a*-25*b* to pay out the label strip 28 therefrom. The labeler 23*a*-23*b* illustratively includes a pair of take-up motors, for example, the illustrated take-up stepper motors 52*a*-52*b*, downstream from the separation notch member 38 to take up the separated strip portions. Advantageously, the labeler 23*a*-23*b* may use the pay-out and take-up stepper motors 51, 52*a*-52*b* to control use of label supply 25*a*-25*b*. The labeler 23*a*-23*b* illustratively includes an edge detector 53 (FIG. 3) carried by the housing 31 for sensing at least one of the shaped edge of the label strip 28 and the labels 29, i.e. the edge of the labels.

Figure 4:
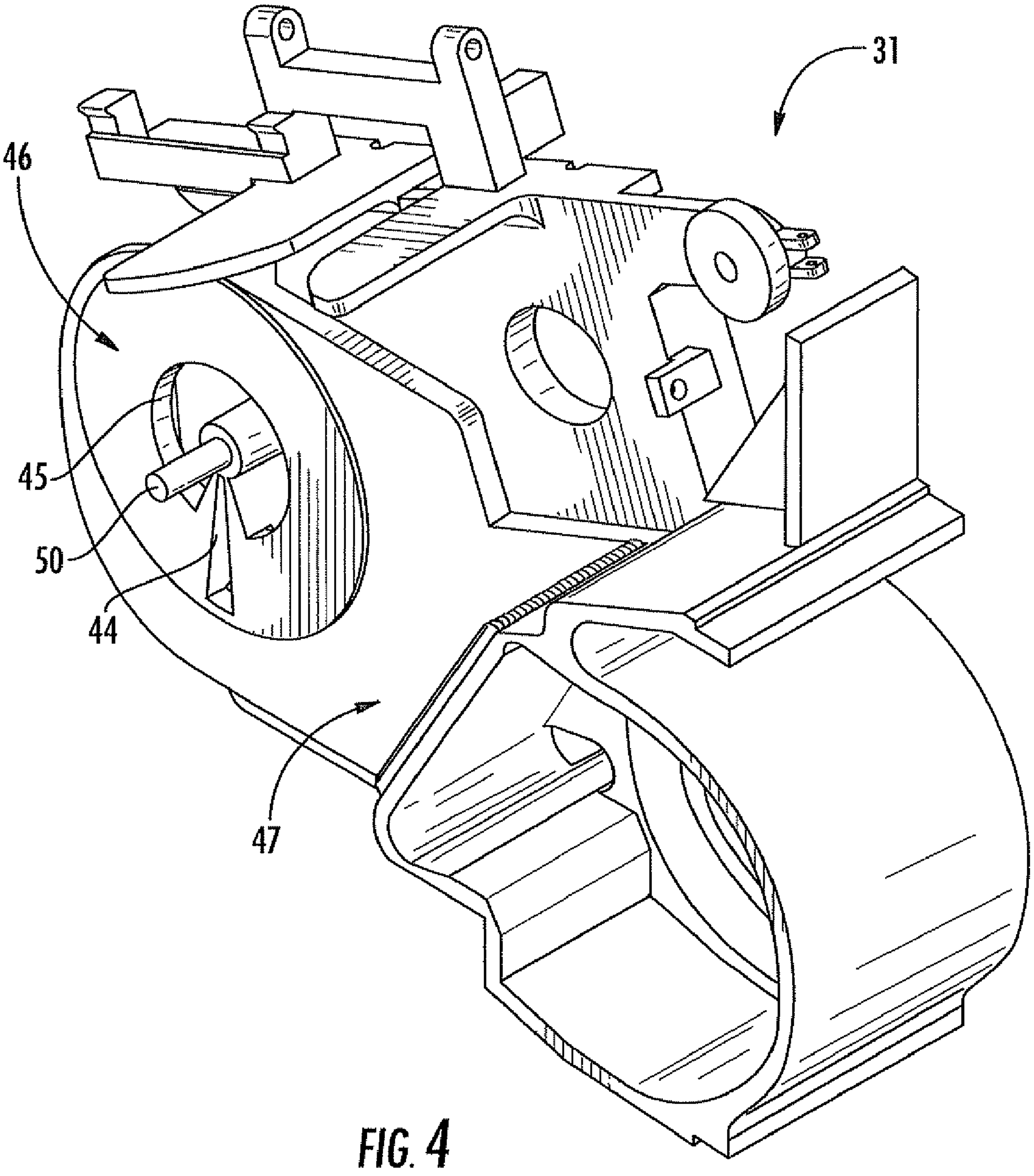
FIG. 4 is a perspective view of the housing from the labeler of FIG. 1.
Figure 5:
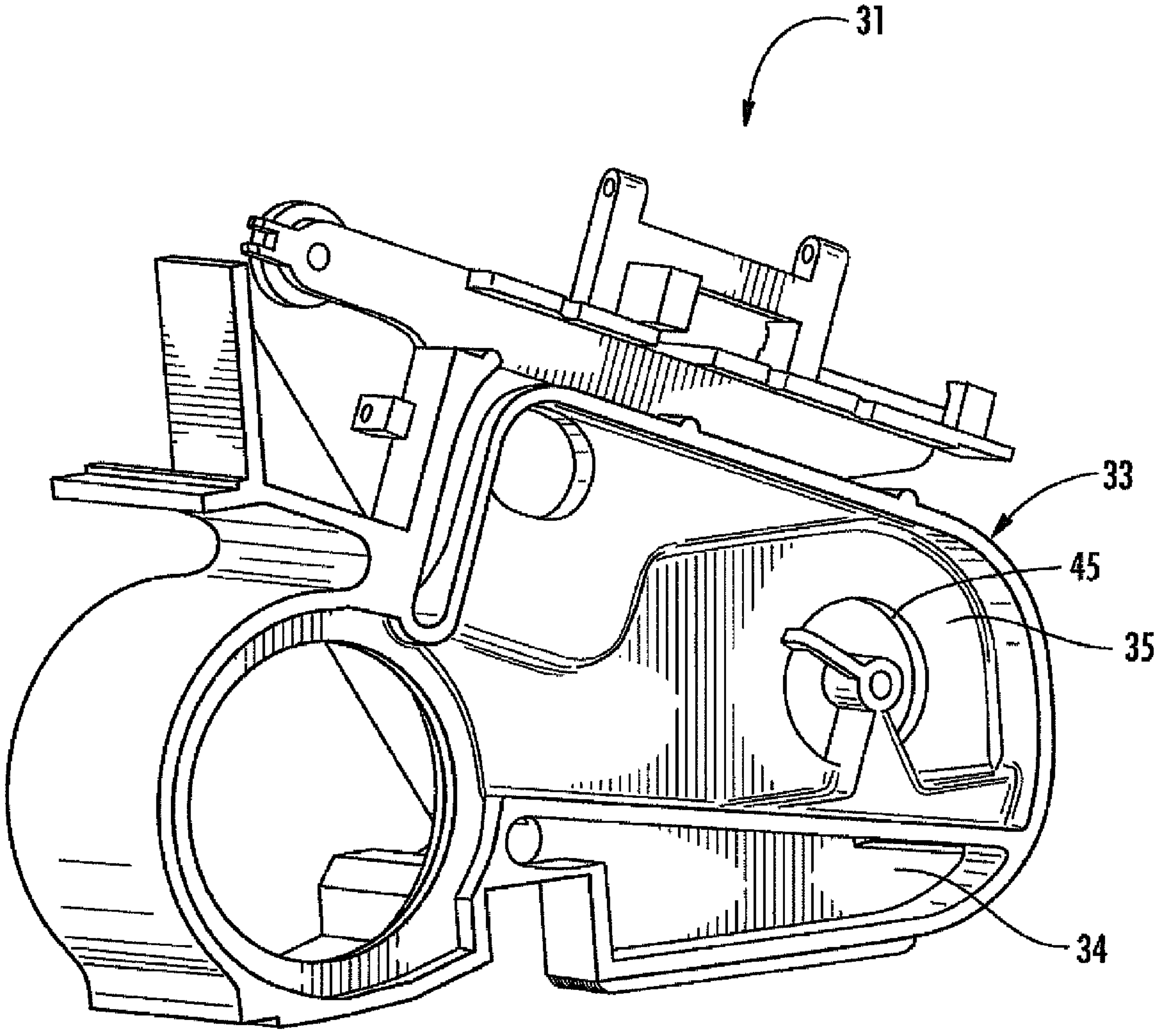
FIG. 5 is another perspective view of the housing from the labeler of FIG. 1.

Referring now additionally to FIGS. 4-5, the housing 31 illustratively includes interior portions defining a pressure delivery chamber 33 extending between the fluid pump 27 and the rotary bellows wheel 24. The pressure delivery chamber 33 illustratively includes a positive pressure delivery chamber 34 and a negative fluid pressure delivery chamber 35. Moreover, as perhaps best seen in FIG. 3, the drive belt 37 extends through the negative fluid pressure delivery chamber 35.

The housing 31 illustratively includes a sidewall 47 and a shaft 50 extending outwardly from the sidewall. As perhaps best seen in FIG. 2, the rotary bellows wheel 24 is carried by the shaft 50. The labeler 23*a*-23*b* includes a tensioning device, for example, a biasing spring, not shown, between the drive belt 37 and the housing 31 for tensioning the bearing surface of the rotary bellows wheel 24 against the housing, providing a seal between the vacuum and pressure porting. Helpfully, the tensioning device may also compensate for the eventual wear of the rotary bellows wheel 24 due to rotation against the stationary housing 31.

The labeler 23*a*-23*b* illustratively includes a controller 32 for controlling the fluid pump 27, the bellows wheel stepper motor 36, the pay-out stepper motor 51, and the take-up stepper motors 52*a*-52*b*. Advantageously, the controller 32 may permit independent control of the pay-out stepper motor 51 and the take-up stepper motors 52*a*-52*b*. Moreover, the controller 32 may control the motors, of the labeler 32*a* based upon the edge detector 53. In some embodiments, the edge detector 53 may comprise an optical edge detector, for example. As will be appreciated by those skilled in the art, the controller 32 may cooperate with the edge detector 53 to automatically adjust the indexing of the motors for: differing types of labels 29 and changes in ambient humidity and temperature. In other embodiments, an operator may set these parameters.

Referring now additionally to FIGS. 6-9, the rotary bellows wheel 24 and adjacent portions of the housing 31 illustratively define a porting arrangement. The rotary bellows wheel 24 illustratively includes a sidewall 41 having a first pattern of openings 42*a*-42*h*, 43*a*-43*h* therein. More particularly and as perhaps best seen in FIG. 4, the housing 31 illustratively includes an interface portion 46 for the rotary bellows wheel 24. The interface portion 46 has a second pattern of openings 44-45 therein. The first 42*a*-42*h*, 43*a*-43*h* and second 44-45 patterns of openings cooperate to define the porting arrangement.

The interface portion 46 illustratively includes a negative pressure (vacuum) port 45 and a positive pressure (exhaust) port 44 respectively fluidly coupled to the negative fluid pressure delivery chamber 35 and the positive fluid pressure delivery chamber 34.

The porting arrangement selectively connects the rotary bellows wheel 24 to a fluid flow to selectively control internal fluid pressure for the plurality of bellows 26*a*-26*h* so that each bellows is movable between a retracted label pick-up position (FIG. 8) and an extended label-applying position (FIG. 9) and so that a peak negative internal fluid pressure is applied at the label pick-up position and a peak positive internal fluid pressure is applied at the label-applying position. Advantageously, the peak positive internal fluid pressure applied at the label-applying position may provide for effective label application to the fruit F while the peak negative internal fluid pressure applied at the label pick-up position may provide for effective retrieval of labels 29 from the label strip 28.

Figure 7:
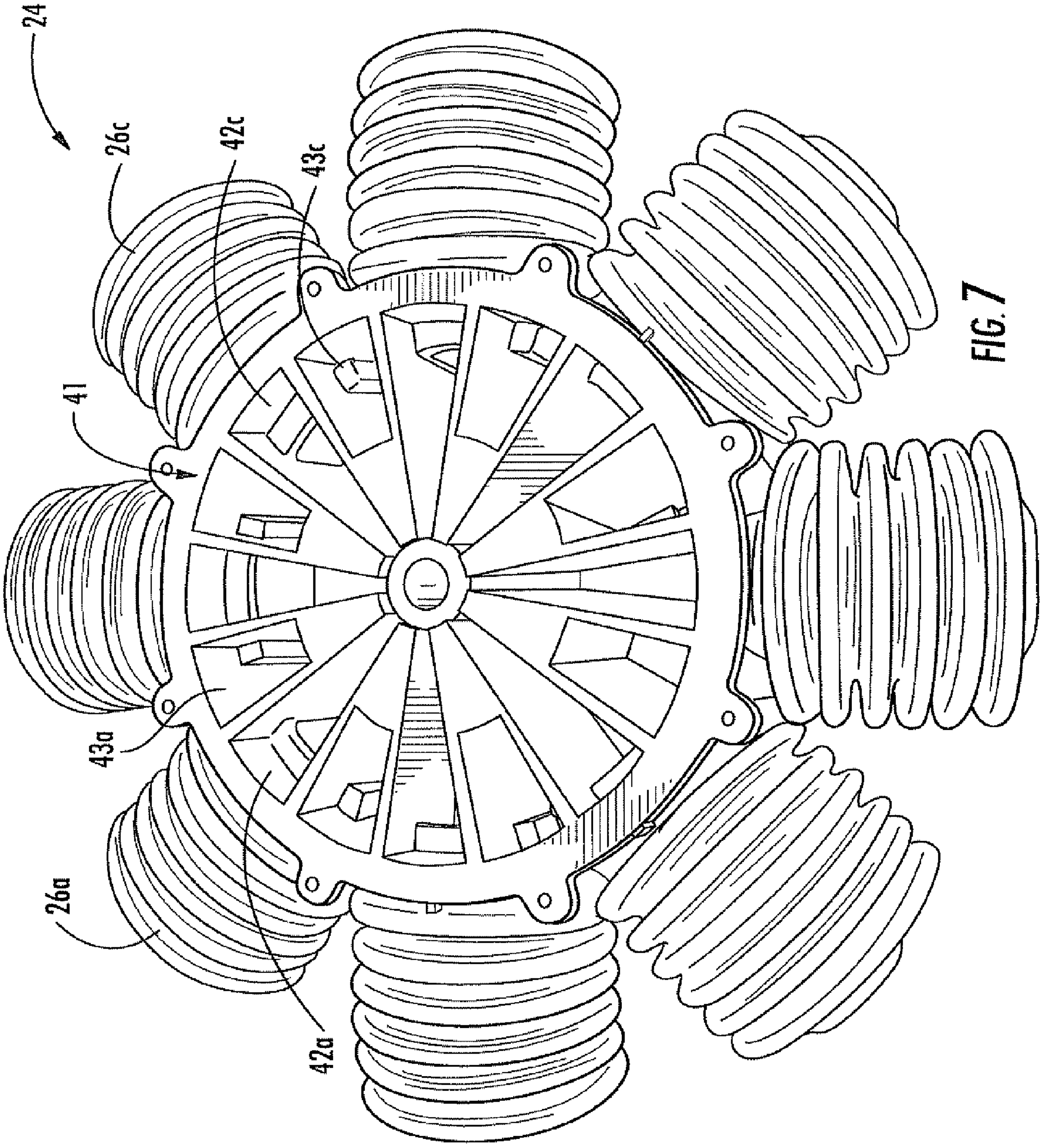
FIG. 7 is back perspective view of the rotary bellows wheel from the labeler of FIG. 1.
Figure 8:
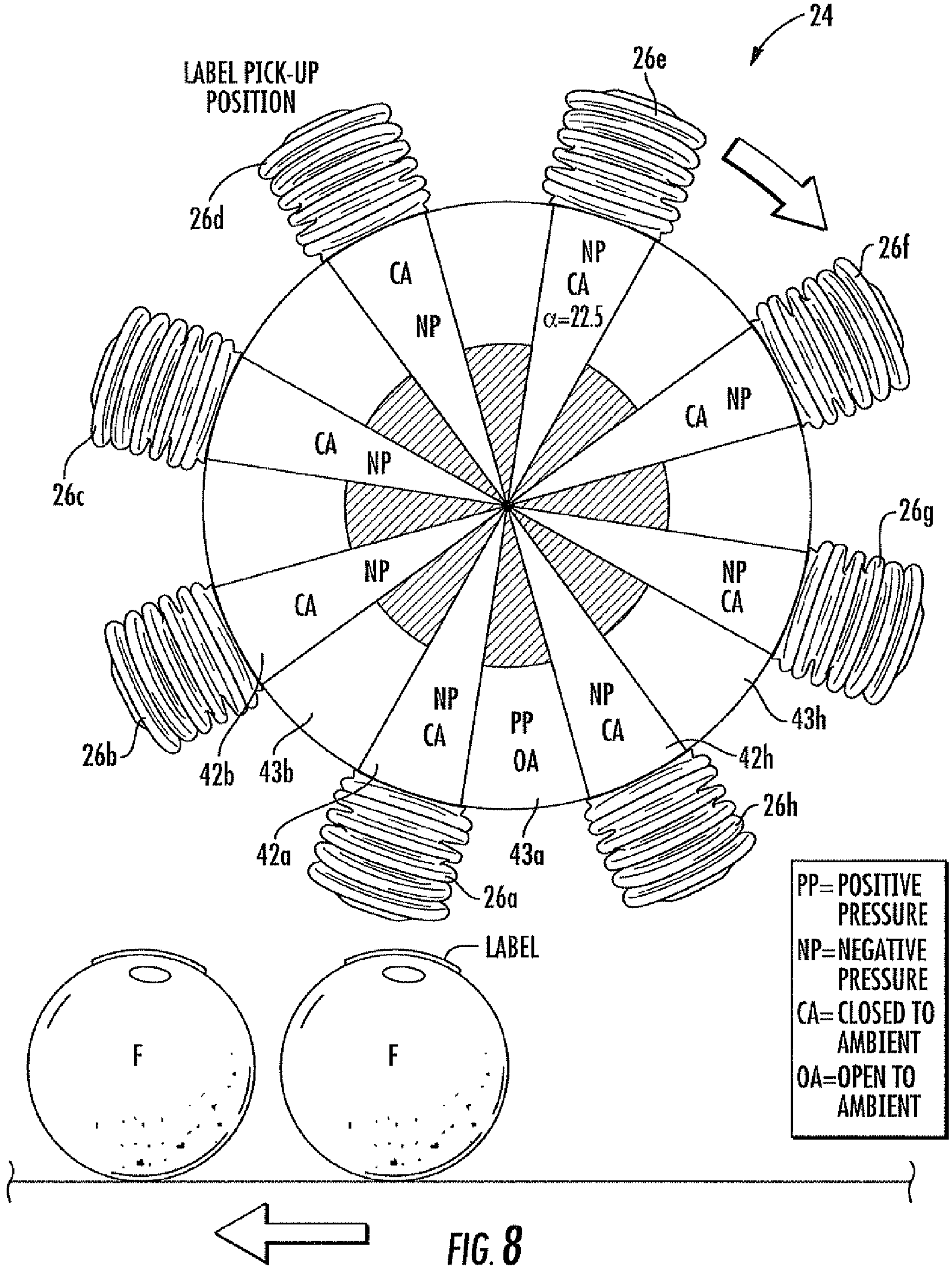
FIG. 8 is a schematic diagram of the rotary bellows wheel from the labeler of FIG. 1 in the label pick-up position.
Figure 9:
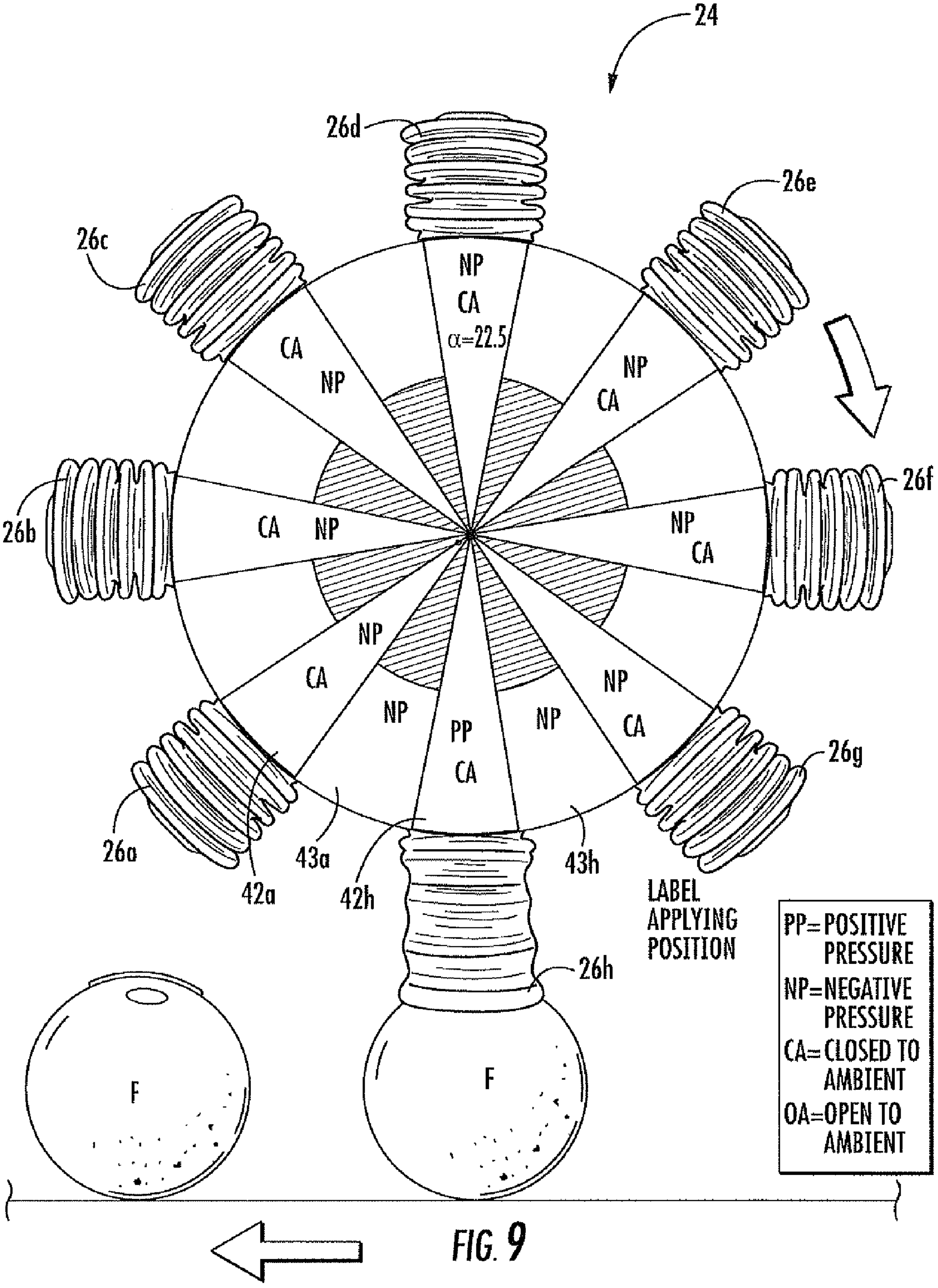
FIG. 9 is a schematic diagram, of the rotary bellows wheel from the labeler of FIG. 1 in the label-applying position.

As perhaps best seen in FIGS. 7-9, the first pattern of openings 42*a*-42*h*, 43*a*-43*h* within the sidewall 41 of the rotary bellows wheel 24 illustratively includes sixteen openings, i.e. illustratively, sixteen equal sectors of the circle-shaped rotary bellows wheel. Each sector of the rotary bellows wheel 24 illustratively has an arc angle $\alpha$ (FIGS. 8-9) of 22.5 degrees. The first pattern of openings includes two types of openings, a bellows-opening 42*a*-42*h* and an intermediate opening 43*a*-43*h*.

Figure 6:
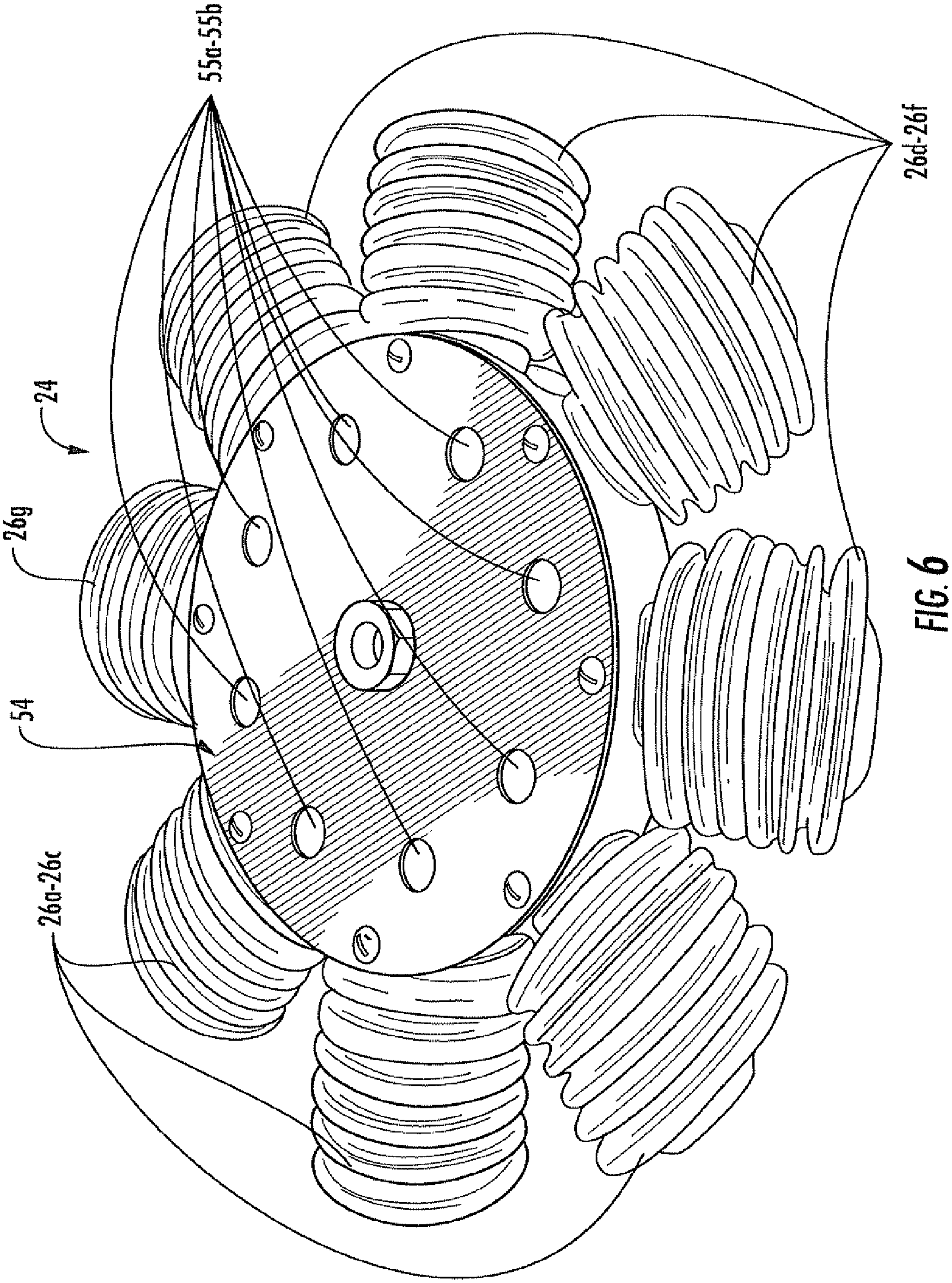
FIG. 6 is a front perspective view of the rotary bellows wheel from the labeler of FIG. 1.

Each of the eight bellows-openings 42*a*-42*h* are arranged directly radially under corresponding bellows 26*a*-26*h*, and as perhaps best seen in FIG. 6, these bellows-openings are closed to the ambient on the opposing sidewall 54, i.e. to restrict airflow and to provide for peak positive internal fluid pressure. The eight bellows-openings 42*a*-42*h* are positioned at 45 degree angles from each other on the rotary bellows wheel 24.

Each of the eight intermediate openings 43*a*-43*h* are arranged between adjacent bellows 26*a*-26*h*, and as perhaps best seen in FIG. 6, these intermediate openings are open to the ambient via openings 55*a*-55*h* on the opposing sidewall 54, i.e. to exhaust airflow and to provide for peak negative internal fluid pressure. The eight intermediate openings 43*a*-43*h* are also positioned at 45 degrees angles from each other on the rotary bellows wheel 24. As perhaps best seen in FIG. 7, the inner radial portion of the intermediate openings 43*a*-43*h* is blocked from exposure to the negative pressure port 45 of the housing 31. Since these intermediate openings 43*a*-43*h* are open to the ambient air, the negative pressure port 45 is not coupled to them during the indexing of the rotary bellows wheel 24.

Referring now specifically to FIG. 8, when the rotary bellows wheel 24 is in the illustrated retracted label pick-up position, the porting arrangement provides for peak negative pressure, i.e. vacuum, at each of the bellows-openings 42*a*-42*h* and the respective bellows 26*a*-26*h*. As will be appreciated by those skilled in the art, during the label pick-up position, the peak negative internal pressure and the openings on the distal ends on each of the bellows 26*a*-26*h* cooperate: to efficiently and readily remove labels 29 from the label strip 28, to retain the labels on the distal ends of the bellows 26*a*-26*h*, and to maintain the bellows in a retracted position. Helpfully, since the fluid pump 27 is providing both the negative internal and positive internal pressure, i.e. the input provides the negative internal pressure and the output provides the positive internal pressure, the positive, pressure is exhausted to the ambient through the intermediate opening 43*a* while each of the bellows-openings 42*a*-42*h* is exposed to peak negative internal pressure. Since the bellows-openings 42*a*-42*h* are all closed to ambient and the output of the fluid pump 27 is exhausted to ambient through the intermediate opening 43*a* positioned at 6 O'clock, the fluid pump is provided maximum airflow and each respective bellow 26*a*-26*h* is subjected to a peak vacuum, including the retracted pick-up bellows 26*d* at 11:15 O'clock, i.e. the label pick-up position.

Referring now specifically to FIG. 9, the rotary bellows wheel 24 has been indexed 22.5 degrees in the clockwise direction and is now in the label-applying position. When the rotary bellows wheel 24 is in the illustrated label-applying position, the porting arrangement provides for negative pressure, i.e. vacuum, at seven of the eight bellows-openings 42*a*-42*g* and the respective bellows 26*a*-26*g*. Each of these seven bellows 26*a*-26*g*, as illustrated, are not the extended applicator bellows 26*h*, being located at 6 O'clock, and therefore are kept in the retracted state by the applied negative internal pressure. Differently, the porting arrangement provides for positive internal pressure for the extended applicator bellows 26*h*, which is closed to ambient to provide for effective extension of the bellows to apply the label 29 to the article F. More so, the intermediate openings 43*a*-43*h* are all open to ambient and fluidly coupled to the input of the fluid pump 27 via the pressure delivery chamber 33, thereby providing for efficient operation of the fluid pump 27. Advantageously, the output airflow of the fluid pump 27 is restricted, thereby providing peak positive pressure.

Once the bellows 26*a* applies the label 29 to the article, the rotary bellows wheel 24 rotates clockwise 22.5 degrees and enters the label pick-up position, similar to the illustrated position in FIG. 8, which retracts the former extended applicator bellows 26*h*.

Advantageously, the porting arrangement permits the rotary bellows wheel 24 to be readily manufactured, for example, using injection molding to provide a monolithic bellows wheel. Indeed, since the porting arrangement defined by the cooperation of the sidewall 41 of the rotary bellows wheel 24 and the interface portion 46 of the housing 31 is supported by the shaft 50 extending from the housing, normal operation of the labeler 23*a*-23*b* incurs reduced wear and tear, which is helpfully concentrated on the readily replaced shaft 50. Thereby, the labeler 23*a*-23*b* may need less maintenance than the typical labeler.

Moreover, since the rotary bellows wheel 24 may comprise a single integrally molded piece rather than the dual-rotatable piece arrangement of typical prior bellows wheels, the presently described bellows wheel may be manufactured to less restrictive, less demanding tolerances, thereby reducing cost of manufacturing. Indeed, the rotary bellows wheel 24 may be manufactured independent of the thermal expansion characteristics of the manufacturing material, unlike the typical bellows wheel. Moreover, since the effects of thermal expansion are reduced in the rotary bellows wheel 24, the rotary bellows wheel may be manufactured from materials having low coefficients, of friction, thereby reducing the torque used by the bellows wheel drive motor 36 for indexing the rotary bellows wheel, which may extend the duty life of the bellows wheel drive motor.

Moreover, since the fluid pump 27 of the labeler 23*a*-23*b* is within the housing 31, the labeler may be installed as a freestanding device. As will be appreciated by those skilled in the art, the freestanding labeler 23*a*-23*b* may permit differing types of fruit F to be singled out and routed to remote process lines, thereby enabling more versatile and efficient processing of fruit, for example, fruits and other perishable items.

Another aspect, is directed to a method for applying labels 29 to fruit F advanced along an article conveyor 21 using at least one labeler 23*a*-23*b* adjacent the article conveyor and comprising a housing 31, a rotary bellows, wheel 24 carried by the housing and supporting a plurality of bellows 26*a*-26*h*. The method may include operating a fluid pump 27 within the housing 31 and connected in fluid communication with the rotary bellows wheel 24 to provide a fluid flow for the bellows 26*a*-26*h* so that each bellows is movable between a retracted position (FIG. 8) and an extended label-applying position (FIG. 9).

Another aspect is directed to a method for applying labels 29 to fruit F advanced along an article conveyor 21 using at least one labeler 23*a*-23*b* adjacent the article conveyor and comprising a housing 31, a rotary bellows wheel 24 carried by the housing and supporting a plurality of bellows 26*a*-26*h*. The method may comprise using a porting arrangement defined by the rotary bellows wheel 24 and adjacent portions of the housing 31 to selectively connect the rotary bellows wheel to a fluid flow and to selectively control internal fluid pressure for the bellows 26*a*-26*h* so that each bellows is movable between a retracted label pick-up position and an extended label-applying position and so that a peak negative internal fluid pressure is applied at the label pick-up position and a peak positive internal fluid pressure is applied at the label-applying position.

Another aspect is directed to a method for applying labels 29 to fruit F advanced along an article conveyor 21 using at least one labeler 23*a*-23*b* adjacent the article conveyor and comprising a housing 31 having a sidewall 47, a shaft 50 extending outwardly from the sidewall, a rotary bellows wheel 24 carried by the shaft and supporting a plurality of bellows 26*a*-26*h*. The method may comprise using a porting arrangement defined by the rotary bellows wheel 24 and adjacent portions of the housing 31 to selectively, connect the rotary bellows wheel to a fluid flow and to selectively control internal fluid pressure for the bellows 26*a*-26*h* so that each bellows is movable between a retracted label pick-up position and an extended label-applying position.

Another, aspect is directed to a method for applying labels 29 to fruit F advanced along an article conveyor 21 using, at least one labeler 23*a*-23*b* adjacent the article conveyor. The labeler 23*a*-23*b* may comprise a housing 31 carrying a label supply 25*a*-25*b* comprising a label strip 28 being separable along a longitudinal centerline, and a plurality of labels 29 carried by the label strip, a rotary bellows wheel 24, a separation notch member 38, and a plurality of bellows 26*a*-26*h* carried by the rotary bellows wheel. The method may include using at least one pay-out stepper motor 51 adjacent the label supply 25*a*-25*b* to pay out the label strip 28 therefrom, and using the separation notch member 38 for separating the label strip into separated strip portions as it is advanced thereover. The method may include using the bellows 26*a*-26*h* to pick up labels 29 from the separation notch member 38 and to place the labels on the fruit F advanced along an article conveyor 21, and using at least one take-up stepper motor 52*a*-52*b* downstream from the separation notch member to take up the separated strip portions.

As will be appreciated by those skilled in the art, the rotary bellows wheel 24 illustratively includes eight bellows 26*a*-26*h* spaced apart at 45 degree angles. In other embodiments, not shown, the rotary bellows wheel 24 may have other bellows 26*a*-26*h* configurations, i.e. differing numbers of bellows and differing spacing.

Other features relating to labelers are disclosed in co-pending applications "Labeling Apparatus Having Porting Arrangement and Related Methods"; "Labeling Apparatus With Sidewall Shaft and Related Methods"; and "Labeling Apparatus With Pay-Out and Take-Up Motors and Related Methods", all incorporated herein by reference in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A labeling apparatus for applying labels to articles advanced along an article conveyor and comprising:

a frame to be positioned adjacent the article conveyor; and a plurality of labelers carried by said frame and each labeler comprising

- an individual housing,
- a rotary bellows wheel carried by said individual housing,
- a plurality of bellows carried by said rotary bellows wheel, and
- a fluid pump within said individual housing and connected in fluid communication with said rotary bellows wheel to provide a fluid flow for said plurality of bellows so that each bellows is movable between a retracted position and an extended label-applying position.

2. The labeling apparatus according to claim 1 wherein said fluid pump comprises an electrical motor and an impeller coupled thereto.

3. The labeling apparatus according to claim 2 wherein each labeler further comprises a controller for controlling said electrical motor.

4. The labeling apparatus according to claim 2 wherein said electrical motor comprises a brushless DC motor.

5. The labeling apparatus according to claim 1 wherein said individual housing includes interior portions defining at least one pressure delivery chamber extending between said fluid pump and said rotary bellows wheel.

6. The labeling apparatus according to claim 5 wherein the at least one pressure delivery chamber comprises a positive pressure delivery chamber and a negative fluid pressure delivery chamber.

7. The labeling apparatus according to claim 5 wherein each labeler further comprises:

a bellows wheel drive motor carried by said individual housing; and a drive coupling between said bellows wheel drive motor and said rotary bellows wheel and extending through the at least one pressure delivery chamber.

8. The labeling apparatus according to claim 1 wherein each labeler further comprises a label feeder carried by said individual housing adjacent said rotary bellows wheel.

9. The labeling apparatus according to claim 1 wherein said a plurality of labelers is arranged in side-by-side relation.

10. A labeler for applying labels to articles and comprising:

an individual housing;

a rotary bellows wheel carried by said individual housing;

a plurality of bellows carried by said rotary bellows wheel; and a fluid pump within said individual housing and connected in fluid communication with said rotary bellows wheel to provide a fluid flow for said plurality of bellows so that each bellows is movable between a retracted position and an extended label-applying position.

11. The labeler according to claim 10 wherein said fluid pump comprises an electrical motor and an impeller coupled thereto.

12. The labeler according to claim 11 further comprising a controller for controlling said electrical motor.

13. The labeler according to claim 11 wherein said electrical motor comprises a brushless DC motor.

14. The labeler according to claim 10 wherein said individual housing includes interior portions defining at least one pressure delivery chamber extending between said fluid pump and said rotary bellows wheel.

15. The labeler according to claim 14 wherein the at least one pressure delivery chamber comprises a positive pressure delivery chamber and a negative fluid pressure delivery chamber.

16. The labeler according to claim 10 further comprising a label feeder carried by said individual housing adjacent said rotary bellows wheel.

17. A method for applying labels to articles advanced along an article conveyor using a plurality of labelers adjacent the article conveyor and each labeler comprising an individual housing, a rotary bellows wheel carried by the individual housing and supporting a plurality of bellows, the method comprising:

operating a fluid pump within the individual housing and connected in fluid communication with the rotary bellows wheel to provide a fluid flow for the plurality of bellows so that each bellows is movable between a retracted position and an extended label-applying position.

18. The method according to claim 17 wherein the fluid pump comprises an electrical motor and an impeller coupled thereto.

19. The method according to claim 18 wherein each labeler further comprises a controller for controlling the electrical motor.

20. The method according to claim 18 wherein the electrical motor comprises a brushless DC motor.

21. The method according to claim 17 wherein the individual housing includes interior portions defining at least one pressure delivery chamber extending between the fluid pump and the rotary bellows wheel.

22. The method according to claim 21 wherein the at least one pressure delivery chamber comprises a positive pressure delivery chamber and a negative fluid pressure delivery chamber.

23. The method according to claim 17 wherein the plurality of labelers is arranged in side-by-side relation.

* * * * *